US012752469B2

(12) United States Patent
Matsuoka

(10) Patent No.: US 12,752,469 B2
(45) Date of Patent: Oct. 6, 2026

(54) BLOW-MOLDED ARTICLE AND METHOD FOR PRODUCING THE SAME

(71) Applicant: KANEKA CORPORATION, Osaka (JP)

(72) Inventor: Yoshiaki Matsuoka, Settsu (JP)

(73) Assignee: KANEKA CORPORATION, Osaka (JP)

( * ) Notice: Subject to any disclaimer, the term of this patent is extended or adjusted under 35 U.S.C. 154(b) by 80 days.

(21) Appl. No.: 18/695,094

(22) PCT Filed: Sep. 27, 2022

(86) PCT No.: PCT/JP2022/036005
§ 371 (c)(1),
(2) Date: Mar. 25, 2024

(87) PCT Pub. No.: WO2023/054388
PCT Pub. Date: Apr. 6, 2023

(65) Prior Publication Data

US 2024/0416572 A1 Dec. 19, 2024

(30) Foreign Application Priority Data

Sep. 29, 2021 (JP) ................................ 2021-158629

(51) Int. Cl.

| | |
|---|---|
| ***C08K 5/14*** | (2006.01) |
| ***B29C 49/00*** | (2006.01) |
| ***B29C 49/04*** | (2006.01) |
| ***B29C 49/06*** | (2006.01) |
| ***C08L 67/04*** | (2006.01) |
| *B29K 67/00* | (2006.01) |

(52) U.S. Cl.
CPC .......... *B29C 49/0005* (2013.01); *B29C 49/04* (2013.01); *B29C 49/06* (2013.01); *C08K 5/14* (2013.01); *C08L 67/04* (2013.01); *B29K 2067/00* (2013.01)

(58) Field of Classification Search
USPC ........................................................ 528/40.5
See application file for complete search history.

(56) References Cited

U.S. PATENT DOCUMENTS 6,201,083 B1 3/2001 Asrar et al.

FOREIGN PATENT DOCUMENTS

| | | | | | |
|---|---|---|---|---|---|
| EP | 2878623 | B1 * | 7/2018 | | C08L 23/06 |
| EP | 4 206 283 | A1 | 7/2023 | | |
| ES | 2503552 | T3 * | 10/2014 | | C08J 9/0066 |
| JP | 2020-122062 | A | 8/2020 | | |

OTHER PUBLICATIONS

ES-2503552-T3 Machine Translation (Year: 2014).*
Rosato, D.V. (1990). Blow Molding. In: Plastics Processing Data Handbook. Springer, Dordrecht. https://doi.org/10.1007/978-94-010-9658-4_4 (Year: 1990).*
International Search Report issued Dec. 6, 2022 in PCT/JP2022/036005, filed on Sep. 27, 2022, 4 pages.

* cited by examiner

*Primary Examiner* — Terressa Boykin
(74) *Attorney, Agent, or Firm* — Oblon, McClelland, Maier & Neustadt, L.L.P.

(57) ABSTRACT

A blow-molded article contains a reaction product of a poly(3-hydroxyalkanoate) resin component and an organic peroxide. The resin component contains a copolymer (A) which is a copolymer of 3-hydroxybutyrate units and other hydroxyalkanoate units and in which the content of the other hydroxyalkanoate units is from 1 to 6 mol % and a copolymer (B) which is a copolymer of 3-hydroxybutyrate units and other hydroxyalkanoate units and in which the content of the other hydroxyalkanoate units is 24 mol % or more. In the resin component, the proportion of the copolymer (A) is from 30 to 70 wt % and the proportion of the copolymer (B) is from 30 to 70 wt %. The amount of the organic peroxide is from 0.01 to 0.8 parts by weight per 100 parts by weight of the resin component.

15 Claims, No Drawings

BLOW-MOLDED ARTICLE AND METHOD FOR PRODUCING THE SAME

CROSS-REFERENCE TO RELATED APPLICATIONS

The present application is a 35 U.S.C. § 371 national stage patent application of International patent application PCT/JP2022/036005, filed on Sep. 27, 2022, which is based on and claims the benefits of priority to Japanese Application No. 2021-158629, filed on Sep. 29, 2021. The entire contents of all of the above applications are incorporated herein by reference.

TECHNICAL FIELD

The present invention relates to a blow-molded article made with a poly(3-hydroxyalkanoate) resin and a method for producing the blow-molded article.

BACKGROUND ART

In recent years, environmental problems caused by waste plastics have become an issue of great concern. In particular, it has been found that a huge amount of plastics dumped at seas or carried into seas through rivers are drifting in the ocean on a global scale. Such plastics, which retain their shapes for a long period of time, are pointed out as having various harmful effects on the ecosystems, and examples of plastics-induced problems include: a phenomenon called ghost fishing where plastics catch or trap marine creatures; and eating disorder from which marine creatures having ingested plastics suffer due to the plastics remaining in their digestive organs.

There is also known a problematic phenomenon where plastics are broken into microplastic particles by the action of ultraviolet rays or any other cause, then the microplastic particles adsorb hazardous compounds present in the ocean, and marine creatures ingest the microplastic particles with the adsorbed compounds, so that hazardous substances are introduced into the food chain.

The use of biodegradable plastics is expected as means for addressing the plastics-induced marine pollution as described above. However, a report issued by the United Nations Environment Programme in 2015 states that plastics such as polylactic acid that can be biodegraded through composting are not expected to be degraded quickly in the actual ocean whose temperature is low and cannot therefore be used as a countermeasure against the marine pollution.

Under these circumstances, poly(3-hydroxyalkanoate) resins, which can be biodegraded even in seawater, are attracting attention as materials that can be a solution to the above problems.

One way of using a poly(3-hydroxyalkanoate) resin is to produce a blow-molded article from the resin. For example, Patent Literature 1 discloses extrusion blow molding using a resin composition that contains 100 parts by weight of a poly(3-hydroxyalkanoate) and 0 to 5 parts by weight of an ester compound and that satisfies a given requirement as to a ratio between a melt viscosity and a drawdown time. Patent Literature 1 states that the disclosed technique allows for stable production of bottles by extrusion blow molding under practical process conditions and offers advantages such as a wide choice of temperature conditions employed in the extrusion blow molding and a wide choice of weights of bottles to be produced.

Patent Literature 2 does not mention blow-molded articles but discloses a method for producing a branched polyhydroxyalkanoate, the method including melting a polyhydroxyalkanoate in the presence of 0.001 to 0.5% peroxide at a temperature above the melting temperature of the polyhydroxyalkanoate and above the decomposition temperature of the peroxide.

CITATION LIST

Patent Literature

PTL 1: Japanese Laid-Open Patent Application Publication No. 2020-122062
PTL 2: U.S. Pat. No. 6,201,083

SUMMARY OF INVENTION

Technical Problem

With the technique described in Patent Literature 1, a molded article made with a poly(3-hydroxyalkanoate) can be produced by extrusion blow molding under practical process conditions. However, the molded article produced has an uneven thickness or is prone to breakage when dropped, and the technique does not allow for production of the molded article by a short-time molding cycle.

In view of the above circumstances, the present invention aims to provide: a blow-molded article made with a poly(3-hydroxyalkanoate) resin, the blow-molded article being highly uniform in thickness, resistant to breakage when dropped, and producible by a short-time molding cycle; and a method for producing the blow-molded article.

Solution to Problem

As a result of intensive studies with the goal of solving the above problem, the present inventors have found that when a blow-molded article is formed from a reaction product of a poly(3-hydroxyalkanoate) resin and a certain amount of organic peroxide and the poly(3-hydroxyalkanoate) resin includes two copolymers differing in the contents of constituent monomers, the blow-molded article obtained can be one that is highly uniform in thickness, that is resistant to breakage when dropped, and that is producible by a short-time molding cycle. Based on this finding, the inventors have completed the present invention.

Specifically, the present invention relates to a blow-molded article containing: a reaction product of a poly(3-hydroxyalkanoate) resin component and an organic peroxide, wherein the poly(3-hydroxyalkanoate) resin component contains a copolymer (A) which is a copolymer of 3-hydroxybutyrate units and other hydroxyalkanoate units and in which a content of the other hydroxyalkanoate units is from 1 to 6 mol % and a copolymer (B) which is a copolymer of 3-hydroxybutyrate units and other hydroxyalkanoate units and in which a content of the other hydroxyalkanoate units is 24 mol % or more, in the poly(3-hydroxyalkanoate) resin component, a proportion of the copolymer (A) is from 30 to 70 wt % and a proportion of the copolymer (B) is from 30 to 70 wt %, and an amount of the organic peroxide is from 0.01 to 0.8 parts by weight per 100 parts by weight of the poly(3-hydroxyalkanoate) resin component.

Advantageous Effects of Invention

The present invention can provide: a blow-molded article made with a poly(3-hydroxyalkanoate) resin, the blow-molded article being highly uniform in thickness, resistant to breakage when dropped, and producible by a short-time molding cycle; and a method for producing the blow-molded article.

DESCRIPTION OF EMBODIMENTS

Hereinafter, embodiments of the present invention will be described. The present invention is not limited to the embodiments described below.

One embodiment of the present invention relates to a blow-molded article containing a reaction product of a poly(3-hydroxyalkanoate) resin component and an organic peroxide.

(Poly(3-hydroxyalkanoate) Resin Component)

The poly(3-hydroxyalkanoate) resin component is a mixture containing at least copolymers (A) and (B) each of which is a copolymer of 3-hydroxybutyrate units and other hydroxyalkanoate units. The use of the mixture allows for production of a blow-molded article made with the poly(3-hydroxyalkanoate) resins, the blow-molded article being highly uniform in thickness, resistant to breakage when dropped, and producible by a short-time molding cycle.

Each of the poly(3-hydroxyalkanoate) resins is preferably a polymer containing 3-hydroxyalkanoate units, in particular a polymer containing units represented by the following formula (1).

$$[\text{—CHR—CH}_2\text{—CO—O—}] \qquad (1)$$

In the formula (1), R is an alkyl group represented by $C_pH_{2p+1}$, and p is an integer from 1 to 15. Examples of the R group include linear or branched alkyl groups such as methyl, ethyl, propyl, methylpropyl, butyl, isobutyl, t-butyl, pentyl, and hexyl groups. The integer p is preferably from 1 to 10 and more preferably from 1 to 8.

Each of the poly(3-hydroxyalkanoate) resins is particularly preferably a microbially produced poly(3-hydroxyalkanoate) resin. In the microbially produced poly(3-hydroxyalkanoate) resin, all of the 3-hydroxyalkanoate units are contained as (R)-3-hydroxyalkanoate units.

Each of the poly(3-hydroxyalkanoate) resins preferably contains 50 mol % or more of 3-hydroxyalkanoate units (in particular, the units represented by the formula (1)) in total structural units, and the content of the 3-hydroxyalkanoate units is more preferably 60 mol % or more and even more preferably 70 mol % or more. Each of the poly(3-hydroxyalkanoate) resins may contain only one type or two or more types of 3-hydroxyalkanoate units as polymer structural units or may contain other units (such as 4-hydroxyalkanoate units) in addition to the one type or two or more types of 3-hydroxyalkanoate units.

Specific examples of the copolymers (A) and (B) include
poly(3-hydroxybutyrate-co-3-hydroxypropionate),
poly(3-hydroxybutyrate-co-3-hydroxyvalerate) abbreviated as "P3HB3HV",
poly(3-hydroxybutyrate-co-3-hydroxyvalerate-3-hydroxyhexanoate),
poly(3-hydroxybutyrate-co-3-hydroxyhexanoate) abbreviated as "P3HB3HH",
poly(3-hydroxybutyrate-co-3-hydroxyheptanoate),
poly(3-hydroxybutyrate-co-3-hydroxyoctanoate),
poly(3-hydroxybutyrate-co-3-hydroxynonanoate),
poly(3-hydroxybutyrate-co-3-hydroxydecanoate),
poly(3-hydroxybutyrate-co-3-hydroxyundecanoate), and
poly(3-hydroxybutyrate-co-4-hydroxybutyrate) abbreviated as "P3HB4HB".

The copolymer (A) is a resin having higher crystallinity than the copolymer (B). The copolymer (A) is inferior in mechanical strength but superior in moldability. The content of 3-hydroxybutyrate units in the copolymer (A) is preferably higher than the average content of 3-hydroxybutyrate units in total monomer units constituting the poly(3-hydroxyalkanoate) resin component. The content of the other hydroxyalkanoate units in the copolymer (A) is from 1 to 6 mol %. The content of the other hydroxyalkanoate units is preferably from 1 to 5 mol % and more preferably from 2 to 5 mol %.

In terms of the properties such as strength and producibility of the blow-molded article, the copolymer (A) is preferably at least one selected from the group consisting of
poly(3-hydroxybutyrate-co-3-hydroxyvalerate),
poly(3-hydroxybutyrate-co-3-hydroxyvalerate-co-3-hydroxyhexanoate),
poly(3-hydroxybutyrate-co-3-hydroxyhexanoate), and
poly(3-hydroxybutyrate-co-4-hydroxybutyrate), more preferably
poly(3-hydroxybutyrate-co-3-hydroxyhexanoate) and/or
poly(3-hydroxybutyrate-co-4-hydroxybutyrate), and even more preferably
poly(3-hydroxybutyrate-co-3-hydroxyhexanoate).

In terms of ensuring both the mechanical strength and producibility of the blow-molded article, the weight-average molecular weight of the copolymer (A) is preferably from $10\times10^4$ to $200\times10^4$, more preferably from $20\times10^4$ to $150\times10^4$, even more preferably from $30\times10^4$ to $100\times10^4$, and particularly preferably from $40\times10^4$ to $80\times10^4$. When the molecular weight is $10\times10^4$ or more, the melt tension is sufficiently high, and problems such as bursting during blow molding can be easily avoided. When the molecular weight is $200\times10^4$ or less, it is easy to achieve a melt viscosity suitable for processing.

The copolymer (B) is a resin having lower crystallinity than the copolymer (A). The copolymer (B) is inferior in moldability but has a high mechanical strength. The content of 3-hydroxybutyrate units in the copolymer (B) is preferably lower than the average content of 3-hydroxybutyrate units in total monomer units constituting the poly(3-hydroxyalkanoate) resin component. The content of the other hydroxyalkanoate units in the copolymer (B) is 24 mol % or more. The content of the other hydroxyalkanoate units is preferably from 24 to 99 mol %, more preferably from 24 to 50 mol %, even more preferably from 25 to 35 mol %, and particularly preferably from 26 to 30 mol %.

In terms of the properties such as strength and producibility of the blow-molded article, the copolymer (B) is preferably at least one selected from the group consisting of
poly(3-hydroxybutyrate-co-3-hydroxyvalerate),
poly(3-hydroxybutyrate-co-3-hydroxyvalerate-co-3-hydroxyhexanoate),
poly(3-hydroxybutyrate-co-3-hydroxyhexanoate), and
poly(3-hydroxybutyrate-co-4-hydroxybutyrate), more preferably
poly(3-hydroxybutyrate-co-3-hydroxyhexanoate) and/or
poly(3-hydroxybutyrate-co-4-hydroxybutyrate), and even more preferably
poly(3-hydroxybutyrate-co-3-hydroxyhexanoate).

The other hydroxyalkanoate units contained in the copolymer (B) may be the same as or different from the other hydroxyalkanoate units contained in the copolymer (A).

In terms of ensuring both the mechanical strength and producibility of the blow-molded article, the weight-average molecular weight of the copolymer (B) is preferably from $20\times10^4$ to $250\times10^4$, more preferably from $25\times10^4$ to $230\times10^4$, and even more preferably from $30\times10^4$ to $200\times10^4$.

In the poly(3-hydroxyalkanoate) resin component, the proportion of the copolymer (A) is from 30 to 70 wt %, and the proportion of the copolymer (B) is from 30 to 70 wt %. If the proportion of the copolymer (A) is less than 30 wt %, the solidification speed of the poly(3-hydroxyalkanoate) resin component is low, and the blow-molded article could be difficult to produce by a short-time molding cycle. If the proportion of the copolymer (B) is less than 30 wt %, the blow-molded article produced could easily break when dropped. Preferably, the proportion of the copolymer (A) is from 35 to 65 wt %, and the proportion of the copolymer (B) is from 35 to 65 wt %. More preferably, the proportion of the copolymer (A) is from 40 to 60 wt %, and the proportion of the copolymer (B) is from 40 to 60 wt %.

The poly(3-hydroxyalkanoate) resin component may contain only the copolymers (A) and (B) or may further contain another poly(3-hydroxy alkanoate) resin. The other poly(3-hydroxyalkanoate) resin may be a homopolymer of 3-hydroxybutyrate or may be a copolymer which is a copolymer of 3-hydroxybutyrate units and other hydroxyalkanoate units and in which the content of the other hydroxyalkanoate units is outside the ranges as defined for the copolymers (A) and (B).

The average content ratio between 3-hydroxybutyrate units and other hydroxyalkanoate units (3-hydroxybutyrate units/other hydroxyalkanoate units) in total monomer units constituting the poly(3-hydroxyalkanoate) resin component including the copolymers (A) and (B) is preferably from 93/7 to 80/20 (mol %/mol %), more preferably from 92/8 to 81/19 (mol %/mol %), even more preferably from 90/10 to 82/18 (mol %/mol %), still even more preferably from 88/12 to 82/18 (mol %/mol %), and particularly preferably from 86/14 to 82/18 (mol %/mol %) in terms of ensuring both the mechanical strength and producibility of the blow-molded article.

The average content ratio between different monomer units in total monomer units constituting the copolymer (A), the copolymer (B), or the poly(3-hydroxyalkanoate) resin component can be determined by a method known to those skilled in the art, such as by a method described in paragraph [0047] of WO 2013/147139. The term "average content ratio" refers to an average molar ratio. The average content ratio between different monomer units in total monomer units constituting the poly(3-hydroxyalkanoate) resin component refers to a molar ratio between different monomer units in total monomer units contained in the whole poly(3-hydroxyalkanoate) resin component including the copolymers (A) and (B).

The weight-average molecular weight of the whole poly (3-hydroxyalkanoate) resin component is not limited to a particular range, but is preferably from $20\times10^4$ to $200\times10^4$, more preferably from $25\times10^4$ to $150\times10^4$, and even more preferably from $30\times10^4$ to $100\times10^4$ in terms of ensuring both the mechanical strength and producibility of the blow-molded article.

The weight-average molecular weight of the copolymer (A), the copolymer (B), or the poly(3-hydroxyalkanoate) resin component can be measured as a polystyrene-equivalent molecular weight by gel permeation chromatography (HPLC GPC system manufactured by Shimadzu Corporation) using a chloroform solution of the copolymer or resin component. The column used in the gel permeation chromatography may be any column suitable for weight-average molecular weight measurement.

The method for producing the copolymer (A) or the copolymer (B) is not limited to a particular technique, and may be a chemical synthesis production method or a microbial production method. A microbial production method is more preferred. The microbial production method used can be any known method. A known example of bacteria that produce a copolymer (P3HB3HH) of 3-hydroxybutyrate units and 3-hydroxyhexanoate units is *Aeromonas caviae.* In particular, in order to increase the P3HB3HH productivity, *Alcaligenes eutrophus* AC32 (FERM BP-6038; see T. Fukui, Y. Doi, *J. Bacteriol.,* 179, pp. 4821-4830 (1997)) having a P3HA synthase gene introduced is more preferred. Such a microorganism is cultured under suitable conditions to allow the microorganism to accumulate P3HB3HH in its cells, and the microbial cells accumulating P3HB3HH are used. Instead of the above microorganism, a genetically modified microorganism having any suitable poly(3-hydroxyalkanoate) resin synthesis-related gene introduced may be used depending on the poly(3-hydroxyalkanoate) resin to be produced. The culture conditions including the type of the substrate may be optimized depending on the poly(3-hydroxyalkanoate) resin to be produced.

The method for obtaining a blend of the copolymers (A) and (B) is not limited to a particular technique. The blend may be obtained directly by microbial production or chemical synthesis. Alternatively, the blend may be obtained by producing the copolymers (A) and (B) individually and then melting and kneading the copolymers (A) and (B) using a device such as an extruder, a kneader, a Banbury mixer, or a roll mill or may be obtained by dissolving each of the copolymers (A) and (B) in a solvent, mixing the resulting solutions, and drying the mixture.

(Organic Peroxide)

The organic peroxide to be reacted with the poly(3-hydroxyalkanoate) resin component is not limited to a particular peroxide, and examples of the organic peroxide include diisobutyl peroxide, cumyl peroxyneodecanoate, di-n-propyl peroxydicarbonate, diisopropyl peroxydicarbonate, di-sec-butyl peroxydicarbonate, 1,1,3,3-tetramethylbutyl peroxyneodecanoate, bis(4-t-butylcyclohexyl) peroxydicarbonate, bis(2-ethylhexyl) peroxydicarbonate, t-hexyl peroxyneodecanoate, t-butyl peroxyneodecanoate, t-butyl peroxyneoheptanoate, t-hexyl peroxypivalate, t-butyl peroxypivalate, di(3,5,5-trimethylhexanoyl) peroxide, dilauroyl peroxide, 1,1,3,3-tetramethylbutyl peroxy-2-ethylhexanoate, disuccinic acid peroxide, 2,5-dimethyl-2,5-bis(2-ethylhexanoylperoxy)hexane, t-hexyl peroxy-2-ethylhexanoate, di(4-methylbenzoyl) peroxide, dibenzoyl peroxide, t-butylperoxy 2-ethylhexyl carbonate, t-butylperoxy isopropyl carbonate, 1,6-bis(t-butylperoxycarbonyloxy) hexane, t-butyl peroxy-3,5,5-trimethylhexanoate, t-butyl peroxyacetate, t-butyl peroxybenzoate. t-amyl peroxy-3,5,5-trimethylhexanoate, 2,2-bis(4,4-di-t-butylperoxycyclohexyl)propane, and 2,2-di-t-butylperoxy butane. Among these, dibenzoyl peroxide, t-butylperoxy 2-ethylhexyl carbonate, and t-butylperoxy isopropyl carbonate are preferred. One organic peroxide may be used alone, or two or more organic peroxides may be used in combination.

The organic peroxide can be used in any form such as a solid or liquid and may be a liquid diluted with a diluent or the like. An organic peroxide mixable with the poly(3-hydroxyalkanoate) resin component (in particular, an organic peroxide that is liquid at room temperature (25° C.)) is preferred because such an organic peroxide can be uniformly dispersed in the poly(3-hydroxyalkanoate) resin component to prevent a local modification reaction.

The amount of the organic peroxide used is set to 0.01 to 0.8 parts by weight per 100 parts by weight of the poly(3-hydroxyalkanoate) resin component in order to improve the thickness uniformity of the blow-molded article. The amount of the organic peroxide is preferably from 0.03 to 0.5 parts by weight, more preferably from 0.05 to 0.3 parts by weight, even more preferably from 0.08 to 0.25 parts by weight, and particularly preferably from 0.1 to 0.2 parts by weight.

The blow-molded article according to the present embodiment contains at least a reaction product of the poly(3-hydroxyalkanoate) resin component and the organic peroxide. The "reaction product" refers to a reaction product in which the poly(3-hydroxyalkanoate) resin component has a cross-linked structure resulting from a reaction with the organic peroxide. The introduction of the cross-linked structure into the poly(3-hydroxyalkanoate) resin component can improve the thickness uniformity of the blow-molded article. The blow-molded article according to the present embodiment may contain an organic peroxide-derived component (such as a product of decomposition of the organic peroxide or a compound derived from the product of decomposition) as a result of the reaction.

The reaction product is preferably obtained by placing the poly(3-hydroxyalkanoate) resin component and the organic peroxide into an extruder and melting and kneading them in the extruder. This allows for uniform cross-linking of the poly(3-hydroxyalkanoate) resin component. In the melting and kneading, other components as described later, such as a nucleating agent, a lubricant, and a plasticizer may be placed into the extruder in addition to the poly(3-hydroxyalkanoate) resin component and the organic peroxide.

To obtain the reaction product, the poly(3-hydroxyalkanoate) resin component or the copolymers (A) and (B) and the organic peroxide may be individually placed into the extruder, or these components may be mixed and then the mixture may be placed into the extruder.

The melting and kneading can be carried out according to a known or conventional method. For example, the melting and kneading can be carried out using an extruder (single-screw or twin-screw extruder) or a kneader. The conditions of the melting and kneading are not limited to particular details and can be set as appropriate. The resin temperature and the residence time are preferably set such that the reaction with the organic peroxide can be completed during the melting and kneading. Specifically, in the melting and kneading, the resin temperature as measured by a thermometer on the die is preferably from 155 to 175° C. In the melting and kneading, the residence time in the extruder is preferably from 60 to 300 seconds.

After the melting and kneading, the resulting resin material may be extruded into a strand, which may be cut to obtain pellets in the form of cylindrical, elliptic cylindrical, spherical, cubic, or rectangular parallelepiped-shaped particles. Desirably, the pellets thus prepared are thoroughly dried at 40 to 80° C. to remove water before they are subjected to blow molding described later. The pelletization step may be skipped, and the melting and kneading may be followed directly by the blow molding described later.

(Additional Resin)

The blow-molded article according to the present embodiment may contain an additional resin in addition to the poly(3-hydroxyalkanoate) resins to the extent that the additional resin does not diminish the effect of the invention. Examples of the additional resin include: aliphatic polyester resins such as polybutylene succinate adipate, polybutylene succinate, polycaprolactone, and polylactic acid; and aliphatic-aromatic polyester resins such as polybutylene adipate terephthalate, polybutylene sebacate terephthalate, and polybutylene azelate terephthalate. The blow-molded article may contain one additional resin or two or more additional resins.

The amount of the additional resin is not limited to a particular range, but is preferably 30 parts by weight or less, more preferably 20 parts by weight or less, even more preferably 10 parts by weight or less, and particularly preferably 5 parts by weight or less per 100 parts by weight of the poly(3-hydroxyalkanoate) resin component. The lower limit of the amount of the additional resin is not limited to a particular value, and the amount of the additional resin may be 0 part by weight.

(Inorganic Filler)

The blow-molded article according to the present embodiment may contain an inorganic filler in order to increase the strength of the molded article.

The inorganic filler is not limited to a particular type and may be any inorganic filler that can be added to the resin material subjected to blow molding. Examples of the inorganic filler include: silica-based inorganic fillers such as quartz, fumed silica, silicic anhydride, molten silica, crystalline silica, amorphous silica, a filler obtained by condensation of alkoxysilane, and ultrafine amorphous silica; and other inorganic fillers such as alumina, zircon, iron oxide, zinc oxide, titanium oxide, silicon nitride, boron nitride, aluminum nitride, silicon carbide, glass, silicone rubber, silicone resin, titanium oxide, carbon fiber, mica, black lead, carbon black, ferrite, graphite, diatomite, white clay, clay, talc, calcium carbonate, manganese carbonate, magnesium carbonate, barium sulfate, and silver powder. One of these fillers may be used alone, or two or more thereof may be used in combination.

The inorganic filler may be surface-treated in order to increase the dispersibility in the resin material. Examples of the treatment agent used for the surface treatment include higher fatty acids, silane coupling agents, titanate coupling agents, sol-gel coating agents, and resin coating agents.

The water content of the inorganic filler is preferably from 0.01 to 10 wt %, more preferably from 0.01 to 5 wt %, and even more preferably from 0.01 to 1 wt % in order to reliably inhibit hydrolysis of the poly(3-hydroxyalkanoate) resins. The water content can be determined according to JIS K 5101.

The average particle size of the inorganic filler is preferably from 0.1 to 100 μm and more preferably from 0.1 to 50 μm in order to ensure high mechanical strength of, and high moldability into, the blow-molded article. The average particle size can be measured using a laser diffraction/scattering particle size analyzer such as "Microtrac MT310011" manufactured by Nikkiso Co., Ltd.

Among inorganic fillers, silica is preferred since it can provide an improving effect on the mechanical strength of the blow-molded article. The silica is not limited to a particular type. In terms of usability, synthetic amorphous silica produced by a dry or wet process is preferred. Either hydrophobized or hydrophilized silica may be used. One type of silica may be used alone, or two or more types of silica may be used in combination.

The amount of the inorganic filler is not limited to a particular range and may be from 0 to 40 parts by weight per 100 parts by weight of the poly(3-hydroxyalkanoate) resin component. Although the inorganic filler need not be added, the addition of the inorganic filler offers the advantage of increasing the strength of the molded article. In the case where the inorganic filler is added, the amount of the inorganic filler is preferably from 5 to 35 parts by weight and more preferably from 10 to 30 parts by weight.

The silica described above is preferably used in combination with a dispersion aid in order to increase the dispersibility of the silica.

Examples of the dispersion aid include glycerin ester compounds, adipic ester compounds, polyether ester compounds, phthalic ester compounds, isosorbide ester compounds, and polycaprolactone compounds. Among these, the following compounds are preferred because they have high affinity for the resin component and are less likely to bleed out than other compounds: modified glycerin compounds such as glycerin diacetomonolaurate, glycerin diacetomonocaprylate, and glycerin diacetomonodecanoate; adipic ester compounds such as diethylhexyl adipate, dioctyl adipate, and diisononyl adipate; and polyether ester compounds such as polyethylene glycol dibenzoate, polyethylene glycol dicaprylate, and polyethylene glycol diisostearate. A dispersion aid containing a large amount of biomass-derived component is particularly preferred in order to increase the overall biomass degree of the resulting composition. Examples of such a dispersion aid include: acetylated monoglycerides of Riken Vitamin Co., Ltd. such as BIOCIZER and PL series; and Polysorb series of Roquette Freres. One dispersion aid may be used alone, or two or more dispersion aids may be used in combination.

The amount of the dispersion aid added is preferably from 0.1 to 20 parts by weight per 100 parts by weight of the poly(3-hydroxyalkanoate) resin component in view of the effect of the addition of the dispersion aid and the likelihood of bleed-out of the dispersion aid. It is not necessary to add any dispersion aid.

The blow-molded article according to the present embodiment may contain one or more additives in addition to the inorganic filler to the extent that the additives do not diminish the effect of the invention. Examples of the additives include: a nucleating agent; a lubricant; a plasticizer; an organic filler; a colorant such as a pigment or dye; an odor absorber such as activated carbon or zeolite; a flavor such as vanillin or dextrin; an oxidation inhibitor; an antioxidant; a weathering resistance improver; an ultraviolet absorber; a mold release; a water repellent; an antimicrobial; a slidability improver; and other auxiliary additives. The amounts of these additives can also be set as appropriate. The following describes the nucleating agent, lubricant, and plasticizer in detail.

(Nucleating Agent)

The blow-molded article according to the present embodiment may contain a nucleating agent. Examples of the nucleating agent include: polyols such as pentaerythritol, galactitol, and mannitol; and other compounds such as orotic acid, aspartame, cyanuric acid, glycine, zinc phenylphosphonate, and boron nitride. Among these, pentaerythritol is preferred because it is particularly superior in the accelerating effect on crystallization of the poly(3-hydroxyalkanoate) resin component. One nucleating agent may be used alone, or two or more nucleating agents may be used. The proportions of the nucleating agents used may be adjusted as appropriate depending on the intended purpose.

The amount of the nucleating agent used is not limited to a particular range, but is preferably from 0.1 to 5 parts by weight, more preferably from 0.5 to 3 parts by weight, and even more preferably from 0.7 to 1.5 parts by weight per 100 parts by weight of the poly(3-hydroxyalkanoate) resin component.

(Lubricant)

The blow-molded article according to the present embodiment may contain a lubricant. Examples of the lubricant include behenamide, oleamide, erucamide, stearamide, palmitamide, N-stearyl behenamide, N-stearyl erucamide, ethylenebisstearamide, ethylenebisoleamide, ethylenebiserucamide, ethylenebislauramide, ethylenebiscapramide, p-phenylenebisstearamide, and a polycondensation product of ethylenediamine, stearic acid, and sebacic acid. Among these, behenamide and erucamide are preferred because they are particularly superior in the lubricating effect on the poly(3-hydroxyalkanoate) resin component. One lubricant may be used alone, or two or more lubricants may be used. The proportions of the lubricants used can be adjusted as appropriate depending on the intended purpose.

The amount of the lubricant used is not limited to a particular range, but is preferably from 0.01 to 5 parts by weight, more preferably from 0.05 to 3 parts by weight, and even more preferably from 0.1 to 1.5 parts by weight per 100 parts by weight of the poly(3-hydroxyalkanoate) resin component.

(Plasticizer)

The blow-molded article according to the present embodiment may contain a plasticizer. Examples of the plasticizer include ester compounds such as glycerin ester compounds, citric ester compounds, sebacic ester compounds, adipic ester compounds, polyether ester compounds, benzoic ester compounds, phthalic ester compounds, isosorbide ester compounds, polycaprolactone compounds, and dibasic ester compounds. Examples of the glycerin ester compounds include glycerin diacetomonolaurate. Examples of the citric ester compounds include tributyl acetylcitrate. Examples of the sebacic ester compounds include dibutyl sebacate. Examples of the dibasic ester compounds include benzyl methyl diethylene glycol adipate. One plasticizer may be used alone, or two or more plasticizers may be used. The proportions of the plasticizers used can be adjusted as appropriate depending on the intended purpose.

Among the plasticizers mentioned above, the glycerin ester compounds, dibasic ester compounds, adipic ester compounds, polyether ester compounds, and isosorbide ester compounds are particularly superior in the plasticizing effect on the poly(3-hydroxyalkanoate) resin component, and it is preferable to use one of these ester compounds or two or more thereof in combination.

The amount of the plasticizer used is not limited to a particular range, but is preferably from 0.1 to 15 parts by weight, more preferably from 0.2 to 10 parts by weight, and even more preferably from 0.3 to 5 parts by weight per 100 parts by weight of the poly(3-hydroxyalkanoate) resin component.

(Blow-Molded Article)

The blow-molded article according to the present embodiment contains a reaction product of the poly(3-hydroxyalkanoate) resin component and the organic peroxide which are described above and may further contain the additional resin described above and the additives such as the inorganic filler, nucleating agent, lubricant, and plasticizer which are described above.

The blow-molded article is a molded article having a hollow interior, and atypical example of the blow-molded article is a bottle. The "bottle" refers to a hollow container including at least: a generally circular or polygonal bottom wall; an upright side wall connected to the bottom wall; a top opening; and optionally a top wall. The bottle is usually used to contain a liquid or solid, and the contents of the bottle can be put into or taken out of the bottle through the top opening.

The thickness of the side wall of the blow-molded article according to the present embodiment is not limited to a particular range. For example, the thickness of the side wall is preferably from 0.1 to 5.0 mm on average, more preferably from 0.3 to 4.0 mm on average, even more preferably from 0.5 to 3.0 mm on average, and particularly preferably from 0.6 to 2.0 mm on average. The average thickness of the blow-molded article can be determined by measuring the thicknesses of different portions of the side wall of the blow-molded article in a cross-section perpendicular to the blowing direction and calculating the average of the measured thicknesses. Specifically, the average thickness of the blow-molded article can be calculated in the way described in Examples.

The blow-molded article according to the present embodiment has a side wall that is highly uniform in thickness. Specifically, the percentage of a maximum thickness difference to the average thickness (this percentage may also be referred to as "maximum thickness difference percentage") is preferably 15% or less, more preferably 10% or less, even more preferably 8% or less, still even more preferably 7% or less, particularly preferably 6% or less, and most preferably 5% or less. After the thicknesses of different portions of the side wall of the blow-molded article in a cross-section perpendicular to the blowing direction are measured and the average thickness of the blow-molded article is calculated from the measured thicknesses, the absolute value of the difference between the largest of the measured thicknesses (maximum thickness) and the average thickness and the absolute value of the difference between the smallest of the measured thicknesses (minimum thickness) and the average thickness are determined. The "maximum thickness difference" refers to the greater of the two absolute values. The maximum thickness difference percentage (%) is a value determined by dividing the maximum thickness difference by the average thickness and multiplying the quotient by 100.

In the present application, the average thickness and the maximum thickness difference percentage of the blow-molded article are determined without taking into account the thickness of the bottom wall or top wall of the blow-molded article or the thickness of a wall portion defining the top opening of the blow-molded article. The thickness of any corner portion connecting the side wall to the bottom wall, top wall, or top opening and the thickness of any corner portion of a projection or recess on the side wall are not taken into account either. In the case where the side wall has a thickened portion thicker than the rest of the side wall in order to enable the blow-molded article to be easily held by hand or improve the aesthetic quality or producibility of the blow-molded article, the thickness of the thickened portion of the side wall is not taken into account in determining the average thickness and the maximum thickness difference percentage of the blow-molded article.

The height of the blow-molded article is not limited to a particular range. In terms of portability, the height of the blow-molded article is preferably 50 cm or less, more preferably 40 cm or less, and even more preferably 30 cm or less.

The weight of the blow-molded article is not limited to a particular range. In terms of portability, the weight of the blow-molded article is preferably from 1 to 1000 g, more preferably from 5 to 500 g, even more preferably from 10 to 300 g, and particularly preferably from 20 to 200 g.

(Method for Producing Blow-Molded Article)

A blow-molded article according to one embodiment can be produced by subjecting the reaction product obtained through the above-described melting and kneading (the reaction product is preferably in the form of pellets) to a known blow molding process.

Blow molding is a molding process in which a gas is blown into a plasticized resin material to produce a molded article such as a bottle which has a hollow interior. Any of various molding processes such as extrusion blow molding, multilayer extrusion blow molding, injection blow molding, one-step injection blow molding (also called "hot parison injection blow molding"), and stretch blow molding can be used. Among these, extrusion blow molding or one-step injection blow molding is preferred.

The extrusion blow molding is a process including: extruding a molten resin material into the shape of a tube (parison) from an extruder equipped at its forward end with an annular die; holding the parison in a molten state between two halves of a mold to pinch-off and seal the bottom of the parison; blowing a gas into the parison with its one end closed to form the parison into the shape of a bottle; cooling the bottle-shaped molded article; and opening the mold to take out the cooled molded article. The extrusion blow molding is not limited to using particular means. For example, the extrusion blow molding can be carried out using a common extrusion blow molding machine used for extrusion blow molding of thermoplastic resins. The "common extrusion blow molding machine" refers to a machine including a single-screw extruder equipped with an annular die. The single-screw extruder may be any single-screw extruder that melts and kneads raw material resins fed into it and that discharges the kneaded product at a given rate while maintaining the kneaded product at a desired temperature.

The injection blow molding is a process including: preparing a preform by injection molding; taking the preform out of the mold for injection molding; placing the preform into a mold for blow molding; and blowing a gas into the preform to form the preform into the shape of a bottle.

In a common injection blow molding process, a preform prepared by injection molding is cooled and then reheated before blow molding.

In the one-step injection blow molding, the injection molding and the blow molding are successively performed. In a specific example of the one-step injection blow molding, the preform prepared by the injection molding is taken out of the mold for injection molding before the preform solidifies completely, and then the preform is reheated to a given temperature by means such as an infrared heater as necessary and placed into another mold, in which the blow molding is carried out by blowing a gas under pressure into the preform.

In the present embodiment, where the poly(3-hydroxyalkanoate) resins are characterized by slow solidification, the one-step injection blow molding can be preferably used as an injection blow molding process by taking advantage of such characteristics of the poly(3-hydroxyalkanoate) resins.

The molding temperature in the blow molding is not limited to a particular range and may be any temperature at which the resins can be appropriately melted. For example, the molding temperature is preferably from 135 to 180° C. The "molding temperature" refers to a resin temperature during the period from feed into an extruder to discharge from a die. The resin temperature can be typically measured, for example, by a thermometer mounted on an adapter.

The molding cycle time in the blow molding can be set as appropriate. In the present embodiment, the blow-molded article can be produced by a short-time molding cycle; thus, the molding cycle time may be 40 seconds or less or may be 30 seconds or less. Choosing such a short molding cycle time makes it possible to mass-produce the blow-molded article at high productivity despite the use of poly(3-hydroxyalkanoate) resins. The "molding cycle time" refers to a total time required to form one blow-molded article, the total time including a cooling time required for solidification of the molten resin material.

The temperature of the mold in the blow molding may be set as appropriate and is not limited to a particular range. The temperature of the mold in the blow molding is preferably from 20 to 50° C. to facilitate solidification of the poly(3-hydroxyalkanoate) resins.

The molding system used in the blow molding is not limited to a particular type and may be any of a single-head system, a double-head system, a multi-head system, and a mold-sliding system.

In the following items, preferred aspects of the present disclosure are listed. The present invention is not limited to the following items.

[Item 1]

A blow-molded article containing:

a reaction product of a poly(3-hydroxy alkanoate) resin component and an organic peroxide, wherein the poly(3-hydroxyalkanoate) resin component contains a copolymer (A) which is a copolymer of 3-hydroxybutyrate units and other hydroxyalkanoate units and in which a content of the other hydroxyalkanoate units is from 1 to 6 mol % and a copolymer (B) which is a copolymer of 3-hydroxybutyrate units and other hydroxyalkanoate units and in which a content of the other hydroxyalkanoate units is 24 mol % or more, in the poly(3-hydroxyalkanoate) resin component, a proportion of the copolymer (A) is from 30 to 70 wt % and a proportion of the copolymer (B) is from 30 to 70 wt %, and an amount of the organic peroxide is from 0.01 to 0.8 parts by weight per 100 parts by weight of the poly(3-hydroxyalkanoate) resin component.

[Item 2]

The blow-molded article according to item 1, wherein in a cross-section of the blow-molded article that is perpendicular to a blowing direction, a maximum thickness difference of the blow-molded article is 10% or less of an average thickness of the blow-molded article.

[Item 3]

The blow-molded article according to item 1 or 2, wherein the other hydroxyalkanoate units are 3-hydroxyhexanoate units.

[Item 4]

The blow-molded article according to any one of items 1 to 3, produced by extrusion blow molding or one-step injection blow molding.

[Item 5]

A method for producing the blow-molded article according to any one of items 1 to 4, the method including:

molding a resin composition containing the reaction product by extrusion blow molding or one-step injection blow molding.

[Item 6]

The method according to item 5, wherein a molding cycle time is 30 seconds or less.

EXAMPLES

Hereinafter, the present invention will be specifically described using examples. The technical scope of the present invention is not limited by the examples given below.

(Raw Materials)

Raw materials used in Examples and Comparative Examples are listed below.

[Poly(3-hydroxyalkanoate) Resins]

Copolymer (A-1): Poly(3-hydroxybutyrate-co-3-hexanoate) resin (average content ratio 3HB/3HH=95.4/4.6 (mol %/mol %), weight-average molecular weight=$66\times10^4$ g/mol)

This resin was produced according to a method as described in Example 2 of WO 2019/142845.

Copolymer (A-2): Poly(3-hydroxybutyrate-co-3-hexanoate) resin (average content ratio 3HB/3HH=94.6/5.4 (mol %/mol %), weight-average molecular weight=$62\times10^4$ g/mol)

This resin was produced according to a method as described in WO 2008/010296.

Copolymer (B): Poly(3-hydroxybutyrate-co-3-hexanoate) resin (average content ratio 3HB/3HH=71.8/28.2 (mol %/mol %), weight-average molecular weight=$66\times10^4$ g/mol)

This resin was produced according to a method as described in Example 9 of WO 2019/142845.

Copolymer (C): Poly(3-hydroxybutyrate-co-3-hexanoate) resin (average content ratio 3HB/3HH=88.8/11.2 (mol %/mol %), weight-average molecular weight=$58\times10^4$ g/mol)

This resin was produced according to a method as described in WO 2013/147139.

[Organic Peroxide]

Organic peroxide: t-Butyl peroxy isopropyl monocarbonate (manufactured by NOF Corporation: PERBUTYL I, without diluent)

[Other Materials]

Additive-1: Pentaerythritol (manufactured by Nippon Synthetic Chemical Industry Co., Ltd.: Neulizer P)

Aditive-2: Behenamide (manufactured by Nippon Fine Chemical Co., Ltd.: BNT-22H)

Plasticizer: Glycerin fatty acid ester (manufactured by Riken Vitamin Co., Ltd.: BIOCIZER)

(Compounding)

(Preparation of P3HB3HH Blend)

The amount Ce (kg) of each raw material used in the compounding was determined from the parts by weight We of the raw material in the P3HB3HH blend and the total parts by weight Wt of the P3HB3HH blend by using the calculation formula 1 shown below. The parts by weight We of the raw materials are listed in Table 1.

$$Ce=10\times We\div Wt \quad \text{Calculation formula 1:}$$

Powdery raw materials weighed out according to Table 1 were placed into 75 L Super Mixer manufactured by Kawata Mfg. Co., Ltd. Liquid raw materials (including the organic peroxide) were mixed and stirred to homogeneity and then slowly added to the mixer at 300 rpm over 1 minute. After that, the powdery and liquid raw materials were stirred at 300 rpm for 3 minutes to prepare the P3HB3HH blend. In the case where the liquid materials were not used, the step of adding the liquid materials was skipped.

(Pelletization)

The P3HB3HH blend obtained as above was placed into an intermeshing corotating twin-screw extruder (manufactured by Toshiba Machine Co., Ltd.: TEM 26SS (L/D=60)) and melted and kneaded at a barrel temperature of 140° C., a screw rotational speed of 100 rpm, and a discharge rate of 10 kg/hr. In the case where the organic peroxide is used, the reaction between the P3HB3HH and the organic peroxide proceeds in the course of the melting and kneading. A strand obtained through a die was solidified by passing the strand through a water bath filled with 45° C. hot water, and the solidified strand was cut by a pelletizer to obtain pellets containing a reaction product of the P3HB3HH and the organic peroxide.

Examples 1 to 6 and Comparative Examples 1 to 7

(Production of Blow-Molded Article)

Blow molding was carried out using MSE-40E/43M-A (E1), an electric blow molding machine manufactured by Tahara Machinery Ltd., under the following molding conditions: FB/C1/C2/C3/A/H/D/L=40/145/150/150/155/155/155/155; the screw rotational speed was 40 rpm; the mold used was one for making a 400-ml cylindrical bottle (measuring 17.5 cm in height and 6 cm in diameter and having a mouth to be capped that has a width of 1 cm and a height of 1 cm); and the temperature was set to 40° C. The blow molding resulted in a cylindrical bottle with an average thickness of about 0.9 mm. The blow molding was started after lip adjustment for allowing a cylindrical molten resin to come out of the lip vertically downward.

(How to Measure Maximum Thickness Difference Percentage)

The cylindrical bottle (blow-molded article) obtained as above was cut perpendicular to the blowing direction at levels of 2 cm, 6 cm, 10 cm, and 14 cm from the bottom surface of the bottle to expose round cross-sections of the bottle. On each of the exposed cross-sections, the wall thickness was measured at 450 intervals, with 0° set at the surface that faced toward the extruder. The total of 32 thickness values were thus obtained, and the average of the 32 thickness values was calculated as the average thickness. The absolute value of the difference between the largest of the 32 thickness values and the average thickness and the absolute value of the difference between the smallest of the 32 thickness values and the average thickness were determined, and the greater of the two absolute values was adopted as the maximum thickness difference. The maximum thickness difference was divided by the average thickness to calculate the maximum thickness difference percentage.

(Drop Impact Resistance)

The cylindrical bottle was charged with water and closed with a cap. The weight of the water-containing capped bottle was 450 g. The bottle was allowed to stand at 23° C. for 24 hours, after which the bottle was dropped 10 times onto a P-tile (resin tile made of rigid polyvinyl chloride) from a height where the distance from the P-tile to the bottom surface of the bottle was 2 m. A rating of "Good" was given in the case where the bottle was neither broken nor cracked throughout the 10 drops, while in the case where the bottle was broken or cracked in any of the 10 drops, a rating of "Poor" was given.

(Molding Cycle)

In the case where the blow molding was performed with the molding cycle time set to 30 seconds (including 27 seconds for cooling) and a cylindrical bottle having a desired shape was obtained, a rating of "Good" was given.

A rating of "Poor" was given in the case where the blow molding performed with the molding cycle time set to 30 seconds suffered from insufficient resin solidification which resulted in failure of bottle release from the mold or resulted in deformation of the cylindrical bottle during release from the mold. It should be noted that the molding cycle time was set to 50 seconds when the bottles for the drop test were obtained.

TABLE 1

| | Ex. 1 | Ex. 2 | Ex. 3 | Ex. 4 | Ex. 5 | Ex. 6 | Comp. 1 | Comp. 2 | Comp. 3 | Comp. 4 | Comp. 5 | Comp. 6 | Comp. 7 |
|---|---|---|---|---|---|---|---|---|---|---|---|---|---|
| Copolymer (A-1) | 50 | 50 | 50 | 50 | 60 | 40 | 50 | 20 | 80 | 50 | 100 | | |
| Copolymer (A-2) | | | | | | | | | | | | 100 | |
| Copolymer (B) | 50 | 50 | 50 | 50 | 40 | 60 | 50 | 80 | 20 | 50 | | | |
| Copolymer (C) | | | | | | | | | | | | | 100 |
| Organic peroxide | 0.135 | 0.135 | 0.05 | 0.3 | 0.135 | 0.135 | | 0.135 | 0.135 | 1 | 0.135 | 0.1 | 0.1 |
| Additive-1 | 1 | 1 | 1 | 1 | 1 | 1 | 1 | 1 | 1 | 1 | 1 | | |
| Additive-2 | 0.5 | 0.5 | 0.5 | 0.5 | 0.5 | 0.5 | 0.5 | 0.5 | 0.5 | 0.5 | 0.5 | | |
| Plasticizer | 0.54 | | 0.54 | 0.54 | 0.54 | 0.54 | 0.54 | 0.54 | 0.54 | 0.54 | 0.54 | | |
| Average thickness of bottle (mm) | 0.90 | 0.91 | 0.90 | 0.90 | 0.89 | 0.90 | 0.90 | 0.89 | 0.90 | 0.91 | 0.90 | 0.91 | 0.90 |
| Maximum thickness difference percentage | 4% | 5% | 7% | 6% | 4% | 4% | 16% | 8% | 5% | 19% | 6% | 8% | 9% |
| Drop impact resistance | Good | Good | Good | Good | Good | Good | Good | Good | Poor | Good | Poor | Poor | Good |
| Molding cycle | Good | Good | Good | Good | Good | Good | Good | Poor | Good | Good | Good | Good | Poor |

Table 1 reveals the following findings. In Examples 1 to 6, the maximum thickness difference percentage of the obtained blow-molded article was small; that is, the blow-molded article was highly uniform in thickness. It is also seen that the blow-molded article had high drop impact resistance and was producible by a short-time molding cycle.

In Comparative Example 1, where the blow molding was performed without the reaction with the organic peroxide, the thickness of the produced blow-molded article was non-uniform.

In Comparative Example 2, where the proportion of the copolymer (A) was as low as 20 wt %, a desired blow-molded article was not able to be obtained by the 30-second molding cycle.

In Comparative Example 3, where the proportion of the copolymer (A) was as high as 80 wt %, the blow-molded article lacked sufficient drop impact resistance.

In Comparative Example 4, where the amount of the organic peroxide was as large as 1 part by weight per 100 parts by weight of the poly(3-hydroxyalkanoate) resin component, the thickness of the blow-molded article was non-uniform.

In Comparative Example 5, where the copolymer (B) was not used, the blow-molded article lacked sufficient drop impact resistance.

Comparative Examples 6 and 7 correspond to Examples 11 and 1 of Patent Literature 1, respectively. In Comparative Example 6, where the copolymer (B) was not used, the blow-molded article lacked sufficient drop impact resistance. In Comparative Example 7, where a poly(3-hydroxyalkanoate) resin falling outside the definitions of the copolymers (A) and (B) was used, a desired blow-molded article was not able to be obtained by the 30-second molding cycle.

(Example 7) One-Step Injection Blow Molding

The pellets obtained in Example 5 were subjected to one-step injection blow molding using ASB12N/10T, a one-step injection blow molding machine manufactured by Nissei ASB Machine Co., Ltd.

First, a 4.5-mm-thick preform was obtained by injection molding, in which the barrel temperature of the injection molding machine was 165° C. at the nozzle, 155° C. at the front, 145° C. at the middle, and 135° C. at the rear, the hot runner temperature was 165° C. both at the block and sprue, and the mold temperature was 80° C. The injection molding process required a total of 17 seconds including 4 seconds for mold opening/closing, 1 second for injection, 2 seconds for dwelling, and 10 seconds for cooling (the plasticization time was 7 seconds and included in the cooling time).

The injection molding was followed by reheating of the preform. In the reheating, the surface temperature of a non-contact heating core was 270° C., the surface temperature of a heating pot was 185° C., and the heating time was 17 seconds. The surface temperature of the preform was 105° C. before the reheating.

The reheating was followed by blow molding. The reheated preform with a surface temperature of 121° C. was subjected to the blow molding, in which the air pressure was 0.4 MPa, the blowing time was 15 seconds, the decompression time was 2 seconds, and the mold temperature was 35° C. The blow molding yielded a 400-ml bottle measuring 17.5 cm in height and 6 cm in diameter and having a mouth to be capped that has a width of 1 cm and a height of 1 cm.

Comparative Example 8

The pellets obtained in Comparative Example 2 were subjected to one-step injection blow molding which was performed under the same conditions as in Example 7. The preform was not able to be released from the mold for injection molding. To enable preform release from the mold, the cooling time was increased to 60 seconds.

Since the preform temperature before reheating decreased to as low as 85° C., the surface temperature of the non-contact heating core and the surface temperature of the heating pot in the reheating were adjusted. However, the preform burst in the subsequent blow molding process, which failed to yield any bottle.

TABLE 2

| | Ex. 7 | Comp. 8 |
|---|---|---|
| Copolymer (A-1) | 60 | 20 |
| Copolymer (A-2) | | |
| Copolymer (B) | 40 | 80 |
| Copolymer (C) | | |
| Organic peroxide | 0.135 | 0.135 |
| Additive-1 | 1 | 1 |
| Additive-2 | 0.5 | 0.5 |
| Plasticizer | 0.54 | 0.54 |
| Average thickness of bottle (mm) | 0.90 | — |
| Maximum thickness difference percentage | 7% | — |
| Drop impact resistance | Good | — |
| Molding cycle | Good | — |

Table 2 reveals that in Example 7, the maximum thickness difference percentage of the obtained blow-molded article was small; that is, the blow-molded article was highly uniform in thickness. It is also seen that the blow-molded article had high drop impact resistance and was producible by a short-time molding cycle.

In Comparative Example 8, where the proportion of the copolymer (A) was as low as 20 wt %, no blow-molded article was obtained as already stated.

The invention claimed is:

1. A blow-molded article comprising:

a reaction product of a poly(3-hydroxyalkanoate) resin component and an organic peroxide, wherein the poly(3-hydroxyalkanoate) resin component comprises a copolymer (A) which is a copolymer of 3-hydroxybutyrate units and one type of other hydroxyalkanoate units or two or more different types of other hydroxyalkanoate units and in which a content of all of the other hydroxyalkanoate units is from 1 to 6 mol % based on the total content of units in the copolymer (A), and a copolymer (B) which is a copolymer of 3-hydroxybutyrate units and one type of other hydroxyalkanoate units or two or more different types of other hydroxyalkanoate units and in which a content of all of the other hydroxyalkanoate units is at least 24 mol % based on the total content of units in the copolymer (B), in the poly(3-hydroxyalkanoate) resin component, a proportion of the copolymer (A) is from 30 to 70 wt % and a proportion of the copolymer (B) is from 30 to 70 wt %, and an amount of the organic peroxide is from 0.01 to 0.8 parts by weight per 100 parts by weight of the poly(3-hydroxyalkanoate) resin component.

2. The blow-molded article according to claim 1, wherein in a cross-section of the blow-molded article that is perpendicular to a blowing direction, a maximum thickness difference of the blow-molded article is 10% or less of an average thickness of the blow-molded article.

3. The blow-molded article according to claim 1, wherein the other hydroxyalkanoate units are 3-hydroxyhexanoate units.

4. The blow-molded article according to claim 1, produced by extrusion blow molding or one-step injection blow molding.

5. A method for producing the blow-molded article of claim 1, the method comprising:

molding a resin composition comprising the reaction product of the poly(3-hydroxyalkanoate) resin component and the organic peroxide by extrusion blow molding or one-step injection blow molding.

6. The method according to claim 5, wherein a molding cycle time is 30 seconds or less.

7. The blow-molded article according to claim 1, wherein the copolymer (B) is a copolymer of 3-hydroxybutyrate units and 3-hydroxyhexanoate units in which a content of the 3-hydroxyhexanoate units is from 24 mol % to 30 mol %.

8. The blow-molded article according to claim 1, wherein the copolymer (A) is a copolymer of 3-hydroxybutyrate units and 3-hydroxyhexanoate units.

9. The blow-molded article according to claim 7, wherein the copolymer (A) is a copolymer of 3-hydroxybutyrate units and 3-hydroxyhexanoate units.

10. The blow-molded article according to claim 1, wherein the content of all of the other hydroxyalkanoate units in the copolymer (A) is from 2 to 5 mol %.

11. The blow-molded article according to claim 7, wherein the content of all of the other hydroxyalkanoate units in the copolymer (A) is from 2 to 5 mol %.

12. The blow-molded article according to claim 8, wherein a content of the 3-hydroxyhexanoate units in the copolymer (A) is from 2 to 5 mol %.

13. The blow-molded article according to claim 9, wherein a content of the 3-hydroxyhexanoate units in the copolymer (A) is from 2 to 5 mol %.

14. The blow-molded article according to claim 1, wherein the proportion of the copolymer (A) is from 40 to 60 wt % and a proportion of the copolymer (B) is from 60 to 40 wt %.

15. The blow-molded article according to claim 1, wherein the amount of the organic peroxide is from 0.05 to 0.3 parts by weight per 100 parts by weight of the poly(3-hydroxyalkanoate) resin component.

* * * * *